(12) United States Patent
Sul et al.

(10) Patent No.: US 9,112,445 B2
(45) Date of Patent: Aug. 18, 2015

(54) WINDING SYNCHRONOUS MACHINE HAVING A MOVING OBJECT INCLUDING AN INVERTER CIRCUIT, AND METHOD FOR CONTROLLING SAME

(75) Inventors: Seung-Ki Sul, Seoul (KR); Jung-Ik Ha, Seoul (KR); Eunsoo Jung, Bucheon-si (KR)

(73) Assignee: SNU R&DB Foundation, Seoul (KR)

( * ) Notice: Subject to any disclaimer, the term of this patent is extended or adjusted under 35 U.S.C. 154(b) by 37 days.

(21) Appl. No.: 14/112,524

(22) PCT Filed: Apr. 18, 2011

(86) PCT No.: PCT/KR2011/002756
§ 371 (c)(1),
(2), (4) Date: Oct. 17, 2013

(87) PCT Pub. No.: WO2012/144662
PCT Pub. Date: Oct. 26, 2012

(65) Prior Publication Data
US 2014/0042953 A1 Feb. 13, 2014

(51) Int. Cl.
*H02P 1/46* (2006.01)
*H02P 25/02* (2006.01)
(Continued)

(52) U.S. Cl.
CPC ........... *H02P 25/026* (2013.01); *B60L 11/1803* (2013.01); *H02K 11/0073* (2013.01);
(Continued)

(58) Field of Classification Search
CPC ....... H02K 16/00; H02K 19/00; H02K 19/10; H02K 19/26; H02K 19/28; H02K 47/04; H02P 6/00; H02P 9/14; H02P 1/00; F03D 1/00
USPC ............ 290/31; 310/113; 318/716, 717, 718, 318/719; 322/28
See application file for complete search history.

(56) References Cited

U.S. PATENT DOCUMENTS 3,900,779 A * 8/1975 Kondratenko ................ 318/819
4,218,646 A * 8/1980 Akamatsu ..................... 322/72
(Continued)

FOREIGN PATENT DOCUMENTS

| JP | 10-509017 A | 9/1998 |
| JP | 2009-290930 A | 12/2009 |

(Continued)

OTHER PUBLICATIONS

PCT International Search Report (with English translation) and Written Opinion, PCT/KR2011/002756, Dec. 16, 2011, 10 Pages.

*Primary Examiner* — Shawki S Ismail
*Assistant Examiner* — Zoheb Imtiaz
(74) *Attorney, Agent, or Firm* — Fenwick & West LLP

(57) ABSTRACT

A winding synchronous machine having a moving object including an inverter circuit comprises: a moving-object inverter circuit connected to the moving object of the winding synchronous machine; and a moving-object circuit control device connected to the moving-object inverter circuit so as to control the moving-object inverter circuit. The moving-object circuit control device may comprise: a stator inverter voltage estimator estimating a high-frequency voltage of a stator inverter circuit; a field current reference generator generating a field current reference of the moving object; and an energy storage device voltage controller generating a current reference tracking a DC-link energy storage device voltage of the moving object. Problems associated with using a rare-earth permanent magnet can be thereby overcome, and a winding synchronous machine including an excitation circuit in which ripples almost never occur can be implemented without using an extra power source.

23 Claims, 8 Drawing Sheets

(51) Int. Cl.
  *B60L 11/18* (2006.01)
  *H02P 27/14* (2006.01)
  *H02K 11/00* (2006.01)

(52) U.S. Cl.
  CPC .............. *H02P25/021* (2013.01); *H02P 27/14* (2013.01); *B60L 2220/14* (2013.01); *Y02T 10/642* (2013.01); *Y02T 10/7005* (2013.01)

(56) References Cited

U.S. PATENT DOCUMENTS

| | | | |
|---|---|---|---|
| 5,493,201 A | 2/1996 | Baker | |
| 5,550,456 A * | 8/1996 | Shekhawat et al. | 322/25 |
| 5,770,909 A * | 6/1998 | Rosen et al. | 310/113 |
| 2007/0063677 A1* | 3/2007 | Schauder | 322/29 |
| 2007/0222220 A1* | 9/2007 | Huang et al. | 290/31 |
| 2008/0042613 A1* | 2/2008 | Aizawa et al. | 318/778 |
| 2009/0071735 A1* | 3/2009 | Kaneko et al. | 180/65.285 |
| 2011/0006547 A1* | 1/2011 | McLean et al. | 290/40 A |

FOREIGN PATENT DOCUMENTS

| | | |
|---|---|---|
| JP | 2010-070036 A | 4/2010 |
| JP | 2010-098908 A | 4/2010 |
| WO | WO 96/15580 | 5/1996 |

* cited by examiner

WINDING SYNCHRONOUS MACHINE HAVING A MOVING OBJECT INCLUDING AN INVERTER CIRCUIT, AND METHOD FOR CONTROLLING SAME

TECHNICAL FIELD

The present invention relates to a wound-rotor type synchronous motor or a wound-rotor type synchronous machine equipped with a generator, and in particular to a wound-rotor type synchronous machine equipped with an inverter-integrated rotor or mover.

BACKGROUND ART

Thanks to a great advance in an electric power and electronic technology, the use of an inverter is significantly increasing in a motor/generator application field. As best seen in FIG. 1, a Voltage Source Inverter (VSI) is generally used in an electric and machine driving system. Various types of electric and machine systems may be applied to an inverter application; however an induction motor/generator or a synchronous machine is widely used for industrial applications because it has a higher quality. A rare earth-based permanent magnet synchronous machine is famous for an enhanced torque and output density and a high efficiency, but it has a disadvantage in the middle of operations in a flux weakening or field weakening section since it is hard to change in real time the magnetic flux of a rare earth-based permanent magnet. Despite the above mentioned disadvantage, the use of the permanent synchronous machines is growing in various application fields such as vehicles, wind power, etc. Since a limited number of countries is gifted to exclusively produce the rare earth materials which are used in the rare earth-based permanent magnets, it is hard to obtain enough rare earth materials due to the increasing use of such rare earth materials, which problems consequently cause an increase in costs.

Since an electric vehicle, a hybrid vehicle and a permanent magnet-based wind power generator continue to increase, it is expected that the rare earth-based permanent magnets necessarily adapted in the permanent magnet motor and the generator which are key elements in generating the driving forces for the system become harder and harder to obtain and use, so many researches for developing substitutable materials are in process. As a result of such researches, there are a method of reducing the use of the permanent magnets by changing the structures of the induction motor/generator, wound-rotor type synchronous machine, etc. and a method of substituting an expensive rare earth-based magnet with a cheaper permanent magnet like ferrite.

In case of the typical wound-rotor type synchronous machine, it needs to continuously supply magnetic field current to the wound rotor in order to form field magnetic fluxes. For this, electric power is connected to a field winding of the rotor. In order to externally supply electric current to the rotor of the synchronous machine, an exciter which requires the supply of external electric power is configured in such a way to attach a slip ring to the shaft of the rotor. When the typical exciter is used, the rotor requires separate electric power, and the control of the field fluxes requires a separate circuit for controlling the electric current of the rotor.

FIG. 2 is a view illustrating a half-wave rectified brushless synchronous machine from which a brush and an exciter are removed in an attempt to improve the problems of the exciter of the conventional wound-rotor type synchronous machine. The above mentioned synchronous machine has features in that similar with the typical wound-rotor type synchronous machine, a field winding is installed at the rotor. The field winding is not connected to an external exciter, but to a diode inside the rotor. Since there is not a separate exciter, the magnetic field current of the rotor can be controlled by an inverter connected to a stator. When a voltage with a frequency higher than a synchronous frequency is supplied to the winding of the stator in the circuit of the stator, the voltage and current of the high frequency components are supplied to the rotor with the aid of electromagnetic induction phenomenon. It is known that a current pulsation corresponding to an average value of a magnetic field current is supplied to the stator and the winding of the rotor in order to generate enough air gap flux density in the circuit formed of only the above mentioned diode. The magnetic field current may be supplied in the above mentioned way to the rotor, but a current pulsation components contained in the magnetic field current and the stator current may decrease the efficiency of all parts of the synchronous machine and may cause torque pulsation, which results in the decreased performance of the whole systems.

DISCLOSURE OF THE INVENTION

Technical Problem

Accordingly, it is an object of the present invention to provide a wound-rotor type synchronous machine with an inverter-integrated moving part and a control method thereof which make it possible to substitute the use of a rare earth-based permanent magnet in such a way to integrate in a rotor a circuit equipped with an active switch such as a transistor.

It is another object of the present invention to provide a wound-rotor type synchronous machine with an inverter-integrated moving part and a control method thereof which make it possible to obtain a wider range of operations as compared with a rare earth-based permanent magnet synchronous machine and to enhance an operation efficiency during the control of a magnetic field weakening in such a way to provide a wound-rotor type synchronous machine which is configured to control the magnetic field current of a rotor.

It is further another object of the present invention to provide a wound-rotor type synchronous machine with an inverter-integrated moving part and a control method thereof which make it possible to obtain a flux weakening operation or a field weakening operation depending on speed and load conditions in such a way to provide a wound-rotor type synchronous machine equipped with a rotor having an exciter which does not require a separate external electric power and to control in real time a magnetic field current using an inverter connected to a stator.

Technical Solution

To achieve the above objects, according to a first embodiment of the present invention, there is provided a wound-rotor type synchronous machine including a wound-rotor type synchronous motor or a generator with an inverter circuit-integrated moving part, comprising a moving part inverter circuit which is connected to a moving part of the wound-rotor type synchronous machine; and a moving part circuit controller which is connected to the moving part inverter circuit for thereby controlling the moving part inverter circuit.

Preferably, the moving part circuit controller comprises a stator inverter voltage estimator which estimates a high frequency voltage of the stator inverter circuit; a magnetic field current command generator which generates a magnetic field current command of the moving part; and a direct current link energy storage unit voltage controller which generates a current command which helps follow a voltage of the direct current link energy storage unit voltage of the moving part.

Preferably, the magnetic field current command generator generates a magnetic field current command of the moving part using the estimated stator inverter voltage, and the direct current link energy storage unit voltage controller generates a current command which helps follow the direct current link energy storage unit voltage of the moving part using the estimated stator inverter voltage, and the moving part circuit controller further comprises a current controller which controls the current of the moving part circuit using a magnetic field current command generated by the magnetic field current command generator and a high frequency current command generated by the direct current link energy storage unit voltage controller.

Preferably, the stator inverter voltage estimator estimates a high frequency voltage of the stator inverter circuit in accordance with a magnetic field current and output voltage of the moving part inverter circuit.

Preferably, the current controller feedbacks the magnetic field current from the moving part inverter circuit.

Preferably, the direct current link energy storage unit voltage controller feedbacks the direct current link energy storage unit voltage from the moving part inverter circuit.

Preferably, the moving part inverter circuit is selected from the group consisting of a H-bridge inverter circuit, a modified H-bridge inverter circuit, a multi-phase inverter circuit, a multi-phase inverter circuit modified in consideration of a single direction current conduction, a single phase multi-level inverter circuit, a multi-phase multilevel inverter circuit, and a multi-level inverter circuit modified in consideration of a single direction current conduction.

Preferably, there are further provided a stator inverter circuit which is connected to a stator of the wound-rotor type synchronous machine; and a stator circuit controller which is connected to the stator inverter circuit for thereby controlling the stator inverter circuit.

The stator circuit controller comprises a current command generator which generates a current command from a torque or force command; a high frequency voltage command generator which generates a high frequency voltage command in accordance with a position or speed or a level of the load of the moving part; a current controller which generates a voltage command so as to follow a current command generated by the current command generator; and a carriage unit which supplies a high frequency voltage command generated by the high frequency voltage command generator and a voltage command generated by the current controller.

Preferably, the stator circuit controller comprises a position/speed controller which generates a current command using a position or speed of the moving part; a high frequency voltage command generator which generates a high frequency voltage command in accordance with a position or speed or a level of the load of the moving part; a current controller which generates a voltage command so as to estimate a current command generated by the position/speed controller; and a carriage unit which supplies to the inverter a high frequency voltage command generated by the high frequency voltage command generator and a voltage command generated by the current controller.

Preferably, the position/speed controller detects a position or speed of the moving part and estimates a position or speed of the moving part in accordance with a current and voltage of the stator inverter circuit and generates a current command using the position or speed, and the high frequency voltage command generator generates a high frequency voltage command in accordance with the detected or estimated position or speed or the level of a load of the position/speed controller, and the current controller generates a voltage command which helps follow a current command generated by the position/speed controller.

Preferably, the high frequency voltage command generator generates a high frequency voltage command in inverse proportion to the speed of the rotor or in proportion to the level of the load of the same when a field weakening control is necessary at above a base speed or under a low level load condition under which a high efficiency operation is available in such a way to reduce the loss occurring due to the magnetic field current.

Preferably, the high frequency voltage command generator generates a high frequency voltage command by modulating the level of the magnetic field current which is necessary in the moving part, by a modulation method selected from the group consisting of an amplitude modulation method of a high frequency voltage, a high frequency modulation method of a high frequency voltage and a phase modulation method of a high frequency voltage.

To achieve the above objects, according to a second embodiment of the present invention, there is provided a control method of a wound-rotor type synchronous machine including a wound-rotor type synchronous motor or a generator with an inverter circuit-integrated moving part, comprising estimating a high frequency voltage of a stator inverter circuit; generating a magnetic field current command of a rotor using the estimated stator inverter voltage; generating a current command which helps follow a direct current link energy storage unit voltage of the moving part using the estimated stator inverter voltage; and controlling the current of a moving part circuit in accordance with a magnetic field current command generated by the magnetic field current command generator and a high frequency current command generated by a direct current link energy storage unit voltage controller.

Preferably, in the step of estimating the high frequency voltage, a high frequency voltage of a stator inverter circuit is estimated in accordance with a magnetic field current and an output voltage of the moving part inverter circuit.

Preferably, the step of controlling the current of the moving part circuit further comprises feed-backing a magnetic field current from the moving part inverter circuit.

Preferably, the step of generating the current command helping control the direct current link energy storage unit voltage of the moving part further comprises feed-backing a direct current link energy storage unit voltage from the moving part inverter circuit.

Preferably, there are further provided generating a current command using a position or speed of the moving part; generating a high frequency voltage command in accordance with a position or speed of the moving part; a current control step for generating a control voltage command for following a current command generated in the step of generating the current command; and supplying to the inverter a high frequency voltage command generated in the high frequency voltage command generation step and a control voltage command generated in the current control step.

Preferably, in the step of generating the high frequency voltage command, a high frequency voltage command having a characteristic of an inverse proportion to the speed of the moving part in a field weakening control region or a characteristic of a proportion to the load for a high efficiency operation is generated.

Preferably, in the step of supplying the high frequency voltage command and the voltage command to the inverter, the high frequency voltage command and the voltage command are supplied to the inverter in the form of a Pulse Width Modulation (PWM).

Preferably, in the step of generating the high frequency voltage command, a high frequency voltage command is generated by modulating the level of the magnetic field current which is necessary in the moving part, by a modulation method selected from the group consisting of an amplitude modulation method of a high frequency voltage, a high frequency modulation method of a high frequency voltage and a phase modulation method of a high frequency voltage.

In order to achieve the above objects, according to a third embodiment of the present invention, there is provided a method for estimating a position or speed of a moving part using a current and voltage of a stator inverter circuit of the wound-rotor type synchronous machine of claim 10.

Advantageous Effects

It is advantageous that the present invention makes it possible to improve a supply and demand problem, a material procurement problem and an increased cost problem which were occurred due to the increasing use of a rare earth-based permanent magnet.

The present invention makes it possible to provide a desired operation range in such a way to more reliably control a magnetic field current as compared with a rare earth-based permanent magnet synchronous machine.

The present invention makes it possible to provide a wound-rotor type synchronous machine equipped with an exciter-integrated rotor which does not require a separate electric power.

MODES FOR CARRYING OUT THE INVENTION

The preferred embodiments of the present invention will be described with reference to the accompanying drawings. In the middle of the descriptions of the present invention, if a known function or construction is judged to make unclear the subject matters of the claimed invention, the descriptions on such known function or construction will be omitted. The terms used throughout the descriptions and claims are well defined in consideration of the functions of the present invention and may be interpreted differently from the operator's intension or practices. It is preferred that the terms should be defined in accordance with the contents disclosed herein.

Figure 1:
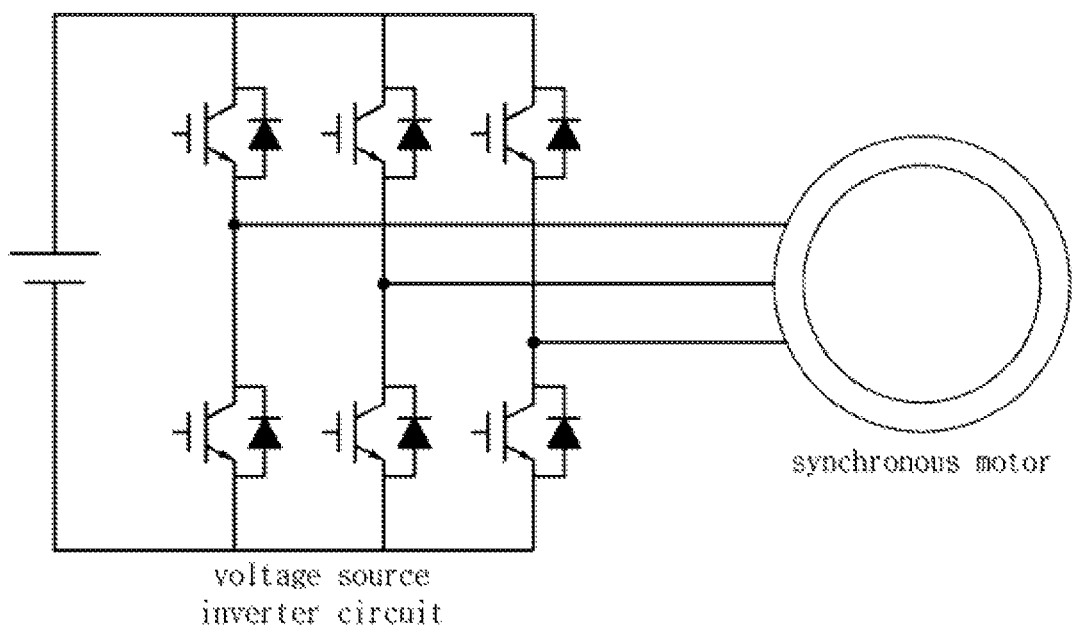
FIG. 1 is a view illustrating a conventional three-phase voltage source inverter-connected synchronous machine.
Figure 2:
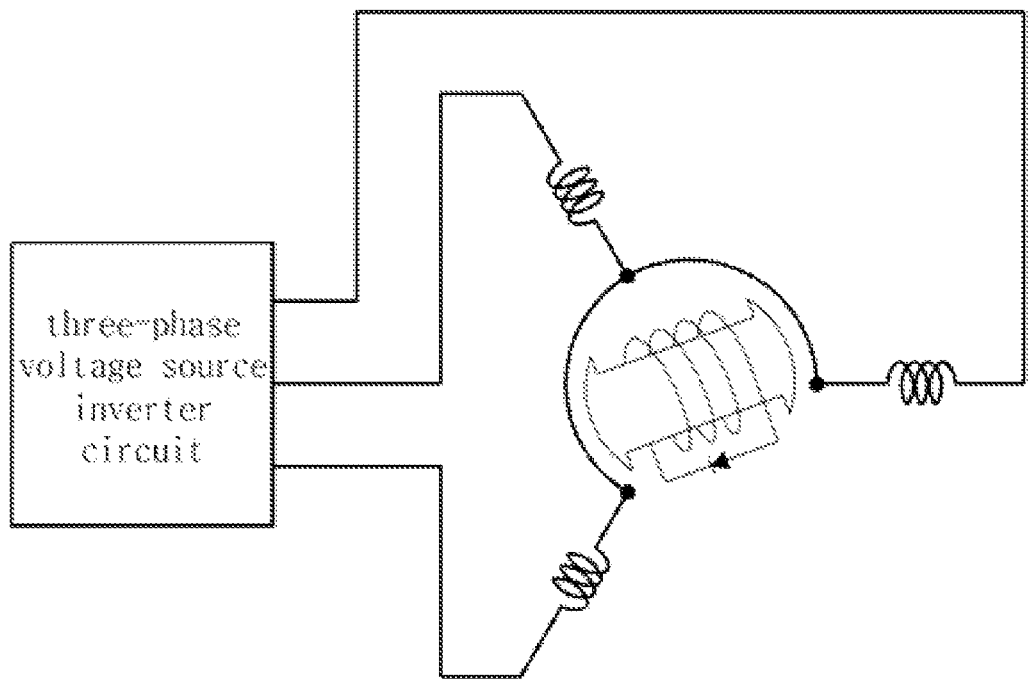
FIG. 2 is a view illustrating a half-wave rectified brushless synchronous machine from which a brush and an exciter are removed.
Figure 3:
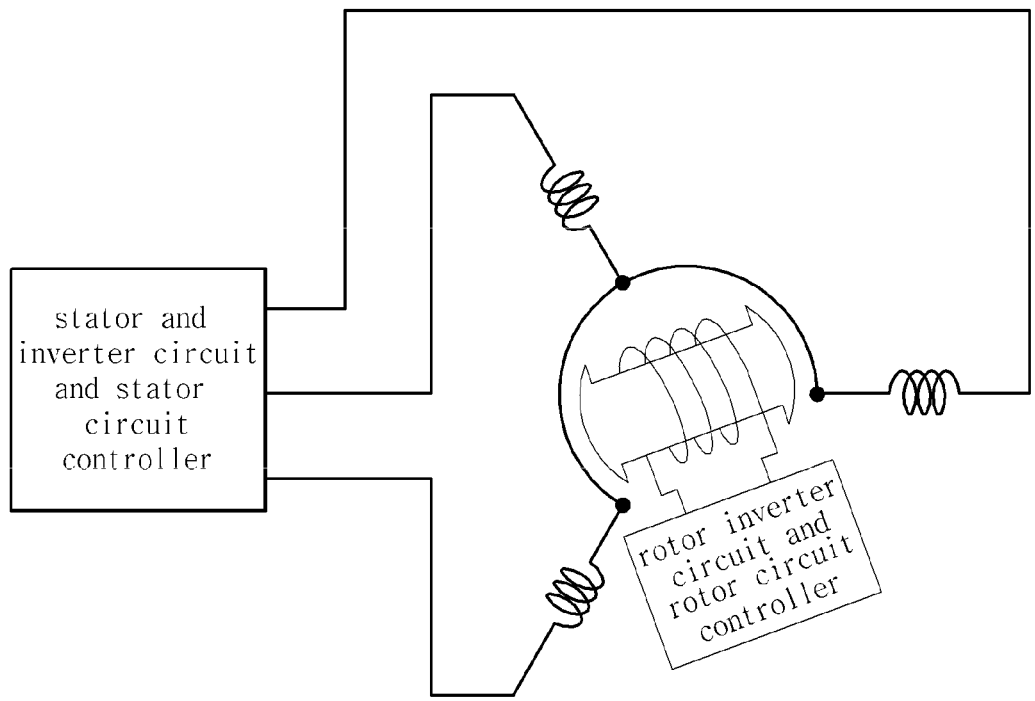
FIG. 3 is a schematic view illustrating a wound-rotor type synchronous machine equipped with an inverter circuit-integrated rotor according to the present invention.

FIG. 3 is a schematic view illustrating a wound-rotor type synchronous machine equipped with an inverter circuit-integrated rotor according to the present invention. The present invention will be described focusing on the rotary devices, but it is obvious that the wound-rotor type linear devices equipped with an inverter circuit-integrated mover will have the same construction and principles. Here the term "mover" represents a rotor of a rotational device and a mover of a linear device. As best seen in FIG. 3, the rotor of the wound-rotor type synchronous machine is not connected to the rotor inverter circuit but connected to a rotor circuit controller. The rotor inverter circuit and the rotor circuit controller which are key elements of the present invention will be described later. FIG. 3 shows the stator inverter circuit and the stator circuit controller. The stator inverter circuit generally has the same construction as the inverter for driving the three-phase motor, provided that in case of the stator circuit controller, it needs to supply a high frequency voltage to the rotor circuit, the construction is different as compared with the known typical construction.

Figure 5:
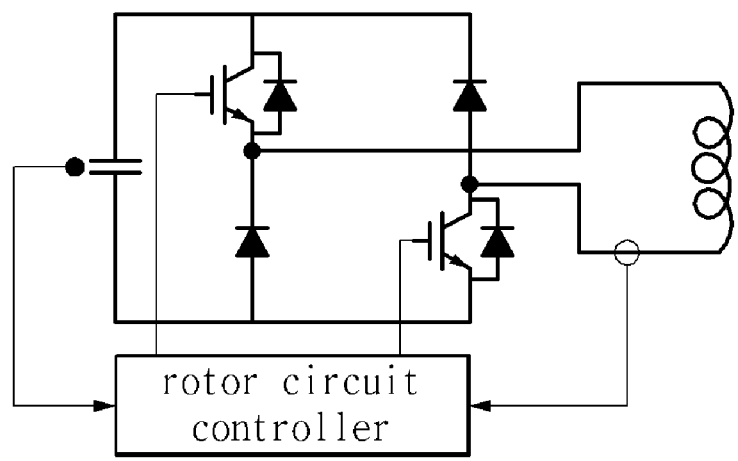
FIG. 5 is a view illustrating a modified H-bridge inverter circuit of a rotor and a rotor circuit controller.

The operations of the synchronous machine and the peripheral circuits according to an embodiment of the present invention will be described. The stator inverter circuit and the stator circuit controller have the same operation principles as the permanent magnet synchronous machine. A sine wave high frequency alternating current voltage is connected to the shaft magnetically connected to the rotor circuit so as to supply electric power to the rotor circuit. The electric wave is assumed as a sine wave for easily understanding in the present invention, but it is obvious that all kinds of alternating current voltage or current including a square wave may be applied. A high voltage voltage/current is generated at a magnetic field winding of the rotor with the aid of an electromagnetic induction phenomenon of a high frequency alternating current voltage and current supplied to the stator circuit. If there is not an active switching of the rotor circuit, the voltage/current of the rotor circuit can be charged by the diode of the circuit of FIG. 5 into a capacitor of a direct current link of the rotor without controls. The present embodiment of the present invention uses a capacitor as a direct current storage unit, but a battery or a super capacitor may be used as an energy storage unit. The modified-bridge inverter circuit of FIG. 5 is an example of the inverter circuit, and various types of circuits such as a single phase half-wave inverter circuit, a single phase full-wave inverter circuit, a multiple-phase inverter circuit, a multi-level inverter circuit, a multi-phase inverter circuit modified in consideration of a single direction current conduction and a multi-level inverter circuit modified in consideration of a single direction current conduction may be used as an inverter circuit. When the capacitor of the direct current link is charged up to a certain level of voltage, the rotor control circuit can be operated so as to drive an active switch formed of a semiconductor (for example, a transistor) and a reverse parallel diode in the circuit of FIG. 5, and the active switching operation can be performed. More specifically describing, the present invention has basic features in that without supplying a separate electric power to the rotor, it is possible to obtain a desired electric power which can compensate the loss in the rotor circuit which occurs due to the operational electric power and magnetic field current of the rotor active device and the rotor circuit controller through a high frequency voltage provided from the stator. The rotor inverter circuit can output a proper voltage in accordance with the type and frequency of the high frequency voltage supplied from the stator and can control the magnetic field current to a certain type. As disclosed in the present invention, it needs to control the magnetic field current in the form of the direct current for the sake of a synchronous operation of the wound-rotor type synchronous machine. In the middle of the above described operations, the capacitor voltage of the direct current link of the rotor lowers due to the resistance of the rotor and the loss in the electric power by means of the switching of the semiconductor device. In order to prevent the above mentioned phenomenon, it needs to continuously supply the electric power as much as the loss through the high frequency voltage/current supplied from the stator, the operations of which can be conducted by way of the voltage control of the direct current link of the rotor inverter. The detailed procedures of the voltage control will be described later.

Figure 4:
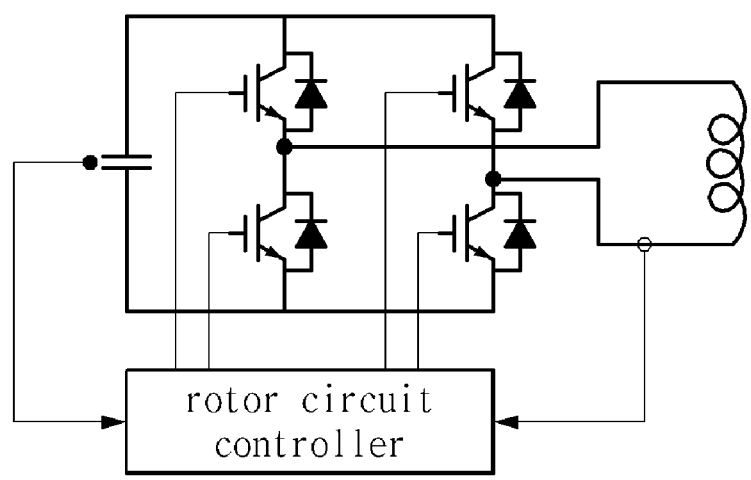
FIG. 4 is a view illustrating a H-bridge inverter circuit of a rotor and a rotor circuit controller.

The inverter circuit connected to the rotor may be formed of a single phase inverter circuit and a multi-phase inverter circuit or may be formed of a multi-polar inverter circuit irrespective of the number of polar. Various kinds of electric power transformation devices capable of controlling the current of the rotor by receiving electric power from the stator can be used. FIG. 4 is a view illustrating a single phase inverter (H-bridge inverter) configured in a H-shaped bridge structure. The single phase inverter is generally configured by connecting a transistor and a reverse parallel diode. In addition, since the direct current component for excitation of the magnetic field current is larger than the alternating current component which is for receiving electric power, and the direction of current is uniform, as shown in FIG. 5, a modified single phase H-bridge inverter from which two transistors are removed can be used as compared with FIG. 4. As best seen in FIG. 5, the rotor circuit controller which controls the capacitor voltage, the magnetic field current and the inverter circuit is connected. The rotor circuit controller may be connected to the basic single phase H-bridge circuit shown in FIG. 4 in the same way.

Figure 6:
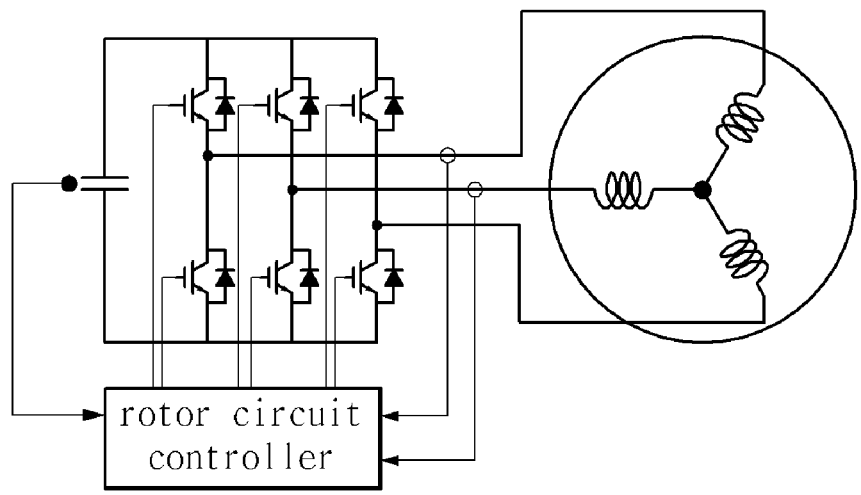
FIG. 6 is a view illustrating a three-phase inverter circuit of a rotor and a rotor circuit controller.

FIG. 6 is a view illustrating a three-phase inverter circuit. Similar with FIG. 5, the rotor circuit controller controlling the capacitor voltage, the magnetic field current and the inverter circuit can be connected. As best seen in FIG. 5, if the direct current component for excitation of the magnetic field current is larger than the alternating current component which is for electric power, and the direction of current is uniform, three transistors may be removed from six transistors.

Figure 7:
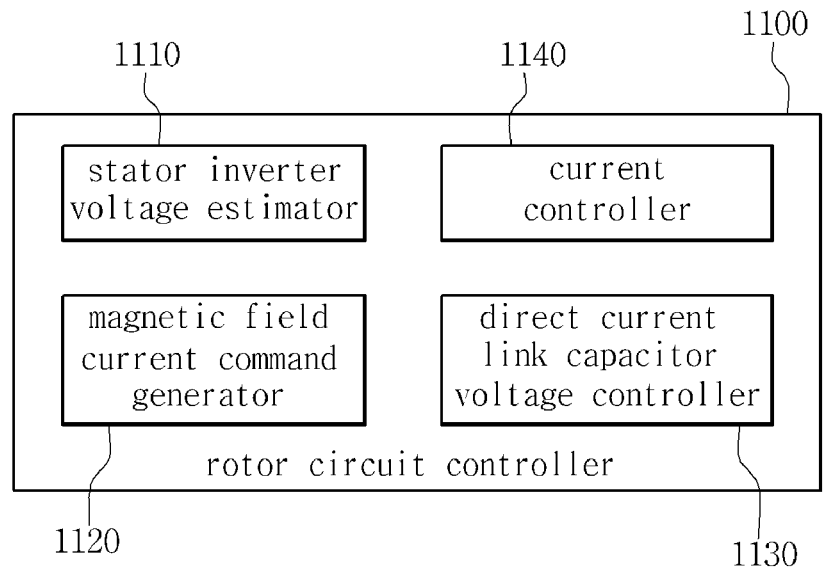
FIG. 7 is a block diagram illustrating an inner construction of a rotor circuit controller.
Figure 12:
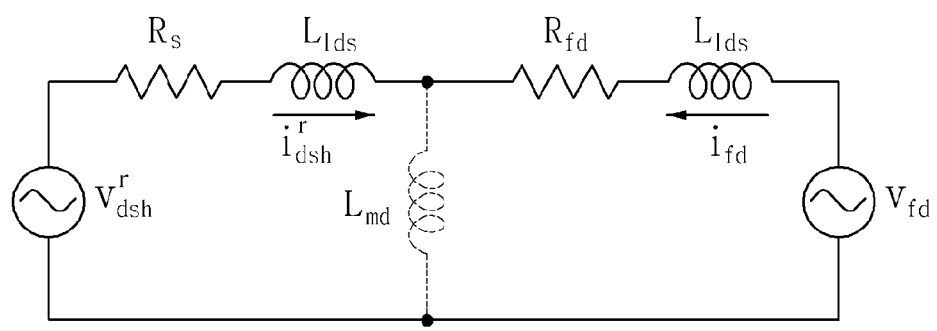
FIG. 12 is a view illustrating a d-axis equivalent circuit of a rotor with respect to an alternating current component for a high voltage estimation.

FIG. 7 is a view illustrating an inner construction of a rotor circuit controller. The rotor circuit controller 700 comprises a stator inverter voltage estimator 710, a magnetic field current command generator 720, a direct current link capacitor voltage controller 730, and a current controller 740. The stator inverter voltage estimator 710 estimates a high frequency voltage of the stator inverter circuit. The stator inverter voltage estimator 710 can estimate a high frequency voltage from the magnetic field current and output voltage of the rotor inverter circuit. The estimation can be performed through a linear observation. As best seen in FIG. 12 which shows the d-axis equivalent circuit in the rotor coordinate with respect to the alternating current component, since the magnetic field current "ifd" is determined in accordance with the high frequency voltage "Vrdsh" supplied from the stator and the voltage "Vfd" supplied from the rotor inverter, the high frequency voltage can be simply estimated based on Ohm's law. The magnetic field current command generator 720 generates a magnetic field current command of the rotor using the estimated stator inverter voltage. The current for forming a magnetic field of the rotor is a direct current component. The direct current link capacitor controller 730 generates a high frequency current command for following the direct current link capacitor voltage of the rotor using the estimated stator inverter voltage. The current of the rotor winding for an electric power control is the alternating current of high frequency component. Since the direct current component and the current of the high frequency component are independent, the levels of them can be adjusted based on the principle of the superposition. In the embodiments of the present invention, if the level of the high frequency voltage can be adjusted in inverse proportion to the speed of the rotor in the field weakening section of the synchronous machine, the rotor controller can generate a command of the magnetic field current using the level of the high frequency voltage. When the speed of the rotor is above a base sped "Wr_base", in other words, when the field weakening control is necessary at above the base speed, or when it needs to improve efficiency by reducing the loss due to the magnetic field current since load is low, the rotor controller can be designed so as to reduce the level of the high frequency voltage which is inputted from the stator. The rotor controller monitors in real time the level of the high frequency voltage. When the level lowers, the command of the magnetic field current can be changed. When the level of the magnetic field current lowers, since the counter electromotive force of the stator winding occurring accordingly decreases, the operation of the synchronous machine becomes possible in the wider speed region without exceeding the limited voltage value. In another embodiment of the present invention, when the synchronous machine operates with light load, the operation efficiency of the synchronous machine can be improved by reducing the loss due to the excitation current in such a way to reduce the stator input voltage. The current controller 740 controls the current by receiving the magnetic field current command and the high frequency current command, so it is possible to reliably control the current using a feedback in such a way to detect the magnetic field current from the rotator inverter circuit. The direct current link capacitor voltage controller 730 can reliably control the voltage using a feedback in such a way to detect the direct current link voltage from the rotor inverter circuit.

Figure 8:
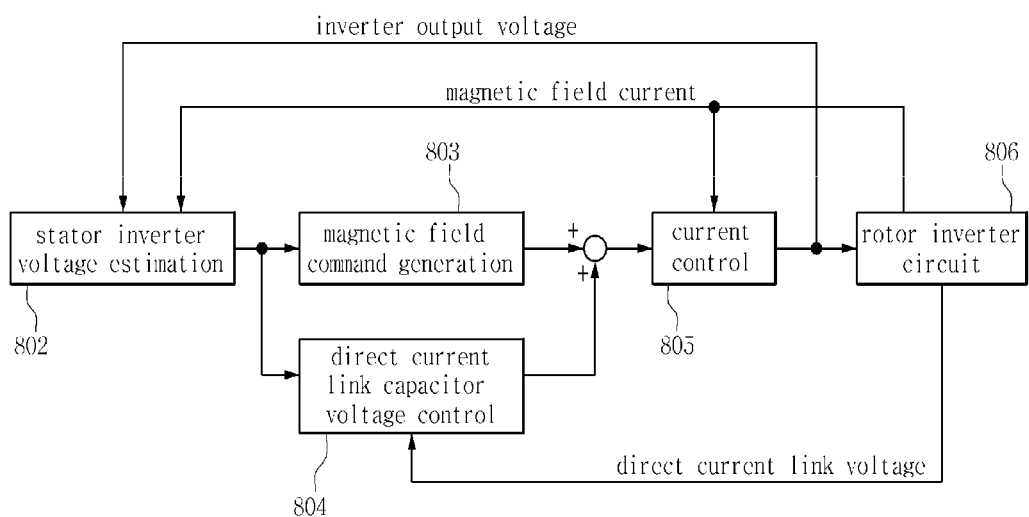
FIG. 8 is a block diagram illustrating a control procedure of a synchronous machine in a rotor.
Figure 13:
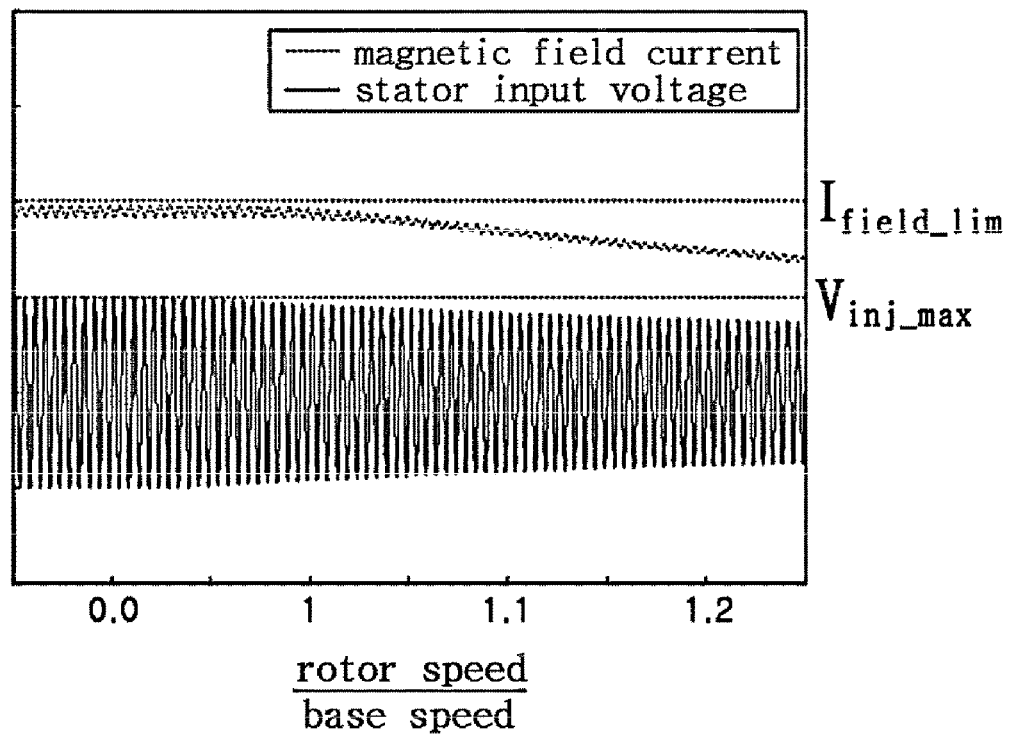
FIG. 13 is a view illustrating an example of a magnetic field current and a stator input voltage in accordance with a speed of a rotor with respect to a base speed for the sake of a field weakening operation.

FIG. 8 is a view illustrating a control procedure of the rotor control circuit. The rotor inverter circuit estimates (802) the stator inverter voltage by detecting the magnetic field current and the direct current link capacitor voltage and generates (803) the magnetic field current command of the rotor using the estimated stator inverter voltage and generates (804) a high frequency current command which helps follow the direct current capacitor voltage and controls (805) the current using the magnetic field current command and the high frequency current command and feedbacks the magnetic field current from the rotor inverter circuit and feedbacks the direct current capacitor voltage to the direct current link capacitor voltage controller. FIG. 13 is a view illustrating a relationship between the magnetic field current and the stator input voltage in accordance with a voltage obtained through the simulations according to an embodiment of the present invention.

A stator controller is designed to adjust the level of the input voltage in accordance with speed. With this, it is possible to observe that the level of input voltage changes as the speed exceeds a base speed. It is possible to observe that the level of the magnetic field current changes in accordance with a changed level of the input voltage in the rotor controller. As best seen in FIG. 13, the magnetic field current contains a direct current component which changes slowly and an alternating voltage component of a uniform frequency, of which the direct current component is a magnetic field current component which helps generate the torque of the synchronous machine, and the alternating current is a high frequency current component which helps supply an electric power from the stator to the rotor.

Figure 9:
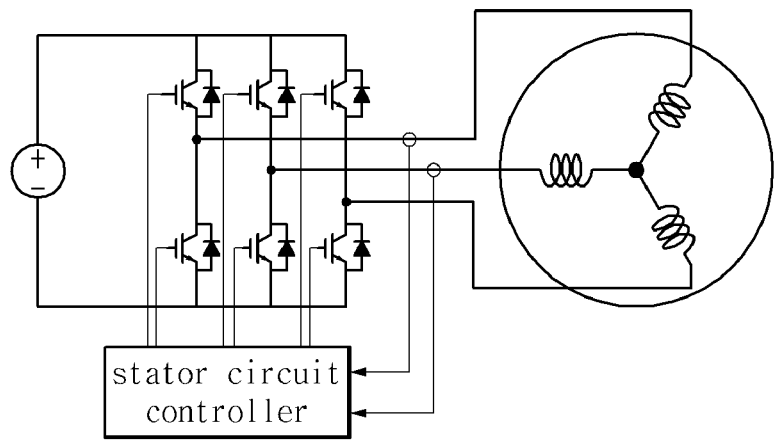
FIG. 9 is a block diagram illustrating an inner construction of a stator circuit controller.

FIG. 9 is a view illustrating a stator inverter circuit and a stator circuit controller, the structures of which are basically same as the typical three-phase circuit controller. The stator inverter circuit may be formed of a multi-phase inverter circuit of more than three phases like the inverter circuit connected to the rotor and may be formed of a multi-polar synchronous machine irrespective of the number of polar.

Figure 10:
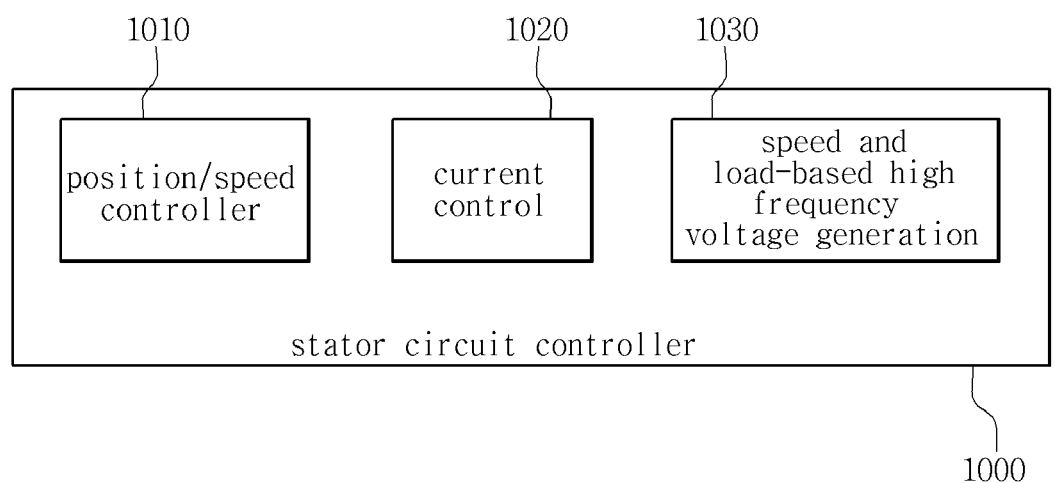
FIGS. 10 and 15 include views illustrating stator circuit controllers.
Figure 15:
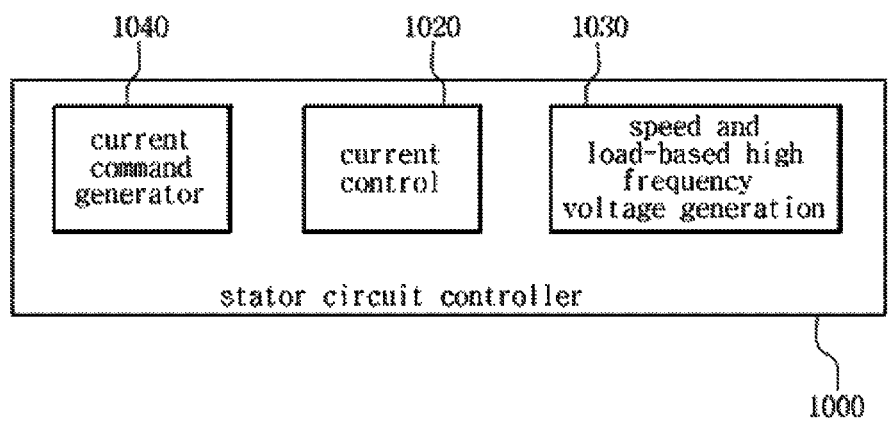

FIG. 10 is a view illustrating an inner construction of the stator circuit controller, which comprises a position/speed controller 1010, a current controller 1020, and a high frequency voltage command generator 1030. The present embodiment of the present invention describes a controller of the stator circuit equipped with the position/speed controller, but depending on an actual application, as shown in FIG. 15, a current command generator 1040 capable of generating a current command by directly receiving a torque or a force command may be also included without the position/speed controller. Structurally different from the typical three-phase circuit controller, there is provided a high frequency voltage command generator. As mentioned earlier, a high frequency voltage of the stator high frequency voltage command generator 1030 is charged in the capacitor, so the active device can be driven for thereby compensating for the loss of electric power. The position/speed controller 1010 detects a position or speed from the mover or estimates a position or speed of the mover using the current and voltage of the stator inverter circuit. In order to estimate the position or speed of the mover, it needs to perform a demodulation when extracting only the current components used for a position estimation from the current of the stator inverter circuit using the frequency or phase of the high frequency voltage of the stator inverter circuit. The output value obtained in the middle of the performed demodulation procedure is proportion to the error of the stator position, so the position/speed observer is so configured that the position error can be reduced, for thereby estimating the position or speed.

The present embodiment of the present invention is directed to a way of controlling the voltage using the detected speed. The current command is generated using the detected speed. In this case, a torque command may be generated instead of the current command. The present embodiment of the present invention describes about generating the current command. The current controller 1020 generates a voltage command so as to follow the current command generated by the position/speed controller 1010. The high frequency voltage command generator 1030 generates a high frequency voltage command based on the speed of the rotor detected by the position/speed controller 1010. In the present invention, it is assumed for better understanding that the high frequency voltage has a sine wave, but it is obvious that an alternating current voltage or current with all kinds waves including a square wave can be applied. The level of the high frequency voltage command can be adjusted in inverse proportion to the speed of the rotor. The voltage command generated by the current controller 1020 and the high frequency voltage command generated by the high frequency voltage command generator 1030 are supplied to the inverter by way of a carriage in superposition. The supply to the inverter can be performed in a Pulse Width Modulation (PWM) method which changes the width of the rectangular shape. The current controller feedbacks the stator current for thereby reliably controlling the current.

Figure 11:
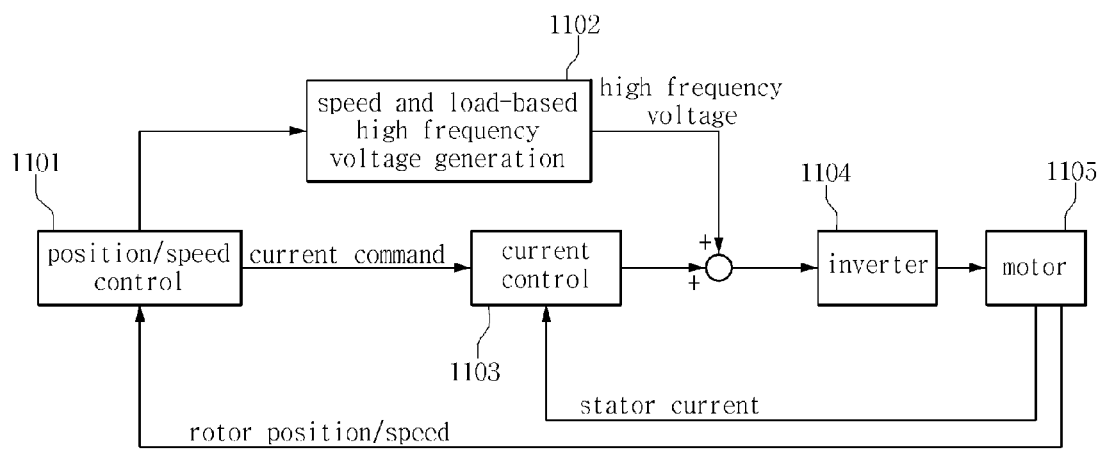
FIG. 11 is a block diagram illustrating a control procedure of a synchronous machine in a stator.

FIG. 11 is a view illustrating a control procedure of the stator control circuit. The position or speed is detected from the synchronous machine rotor, and a current command is generated in accordance with the detected position or speed (1101). A high frequency voltage command is generated in accordance with the detected position or speed (1102). A control voltage command helping follow the current command is generated (1103). The high frequency voltage command and the control voltage command are supplied to the inverter, and the inverter drives the synchronous machine.

Figure 14:
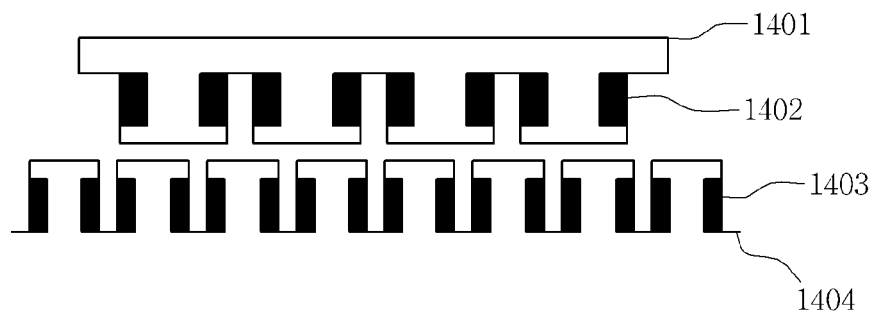
FIG. 14 is a view illustrating an example of a linear synchronous machine.

FIG. 14 is a view illustrating an example of the linear synchronous machine according to the present invention. As best seen therein, a linearizer comprises a mover 1401, a mover coil 1402, a stator coil 1403 and a stator 1404. The linearizer is generally formed of a typical movable winding type (the stator is a permanent magnet) or a movable magnet. In case of the movable winding type, a carriage is installed in parallel with the moving direction of the linearizer so as to supply electric power to the mover, so the electric power cable is forced to move along with the mover. When the stator is substituted with the winding type in the present invention, the carriage and the electric power cable can be removed or the uses of them can be significantly reduced. In the same way, in case of the movable magnet type, when the permanent magnet of the mover is substituted with the winding type, the electric power cable is not used. The longer the moving distance (stroke) of the linearizer is, the bigger the carriage, so the present invention can be easily applied.

The module, functional blocks or mans of the embodiments of the present invention may be implemented with various kinds of known devices such as electronic circuits, integrated circuits, Application Specific Integrated Circuit (ASIC), etc. Such devices may be separately implemented by way of software or hardware or they may be combined for the sake of a specific application.

The present invention is directed to improving the problems encountered in supply and demand of the rare earth-based permanent magnet as the demand of it is continuing to increase and the problems of increasing cost while obtaining enough necessary materials.

INDUSTRIAL APPLICABILITY

The present invention make sure that more operational regions can be obtained by easily controlling the magnetic field current as compared with the rare earth-based permanent magnet, and a high efficiency operation can be performed as compared with the rare earth-based permanent magnet motor in such a way to directly control the level of the magnetic field current in the middle of the field weakening operation.

In addition, the present invention is directed to providing a wound-rotor type synchronous machine equipped with a rotor having an exciter which does not need electric power.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A wound-rotor type synchronous machine with an inverter circuit-integrated moving part, comprising:
   a stator; and
   a moving part magnetically connected to the stator,
   wherein the moving part comprises:
      a winding;
      a moving part inverter circuit which is connected to the moving part through the winding; and
      a moving part circuit controller which is connected to the moving part inverter circuit for thereby controlling the moving part inverter circuit,
   wherein the moving part inverter circuit moves with the moving part, and
   wherein the moving part inverter circuit is configured to be supplied with power from the stator side.

2. The machine of claim 1, wherein the moving part circuit controller comprises:
   a stator inverter voltage estimator which estimates a high frequency voltage of a stator inverter circuit;
   a magnetic field current command generator which generates a magnetic field current command of the moving part; and
   a direct current link energy storage unit voltage controller which generates a current command which helps follow a direct current link energy storage unit voltage of the moving part.

3. The machine of claim 2, wherein the magnetic field current command generator generates a magnetic field current command of the moving part using the estimated stator inverter voltage, and the direct current link energy storage unit voltage controller generates a current command which helps follow the direct current link energy storage unit voltage of the moving part using the estimated stator inverter voltage, and the moving part circuit controller further comprises a current controller which controls the current of the moving part circuit using a magnetic field current command generated by the magnetic field current command generator and a high frequency current command generated by the direct current link energy storage unit voltage controller.

4. The machine of claim 2, wherein the stator inverter voltage estimator estimates a high frequency voltage of the stator inverter circuit in accordance with a magnetic field current and output voltage of the moving part inverter circuit.

5. The machine of claim 3, wherein the current controller feeds back a magnetic field current from the moving part inverter circuit.

6. The machine of claim 3, wherein the direct current link energy storage unit voltage controller feeds back the direct current link energy storage unit voltage from the moving part inverter circuit.

7. The machine of claim 1, wherein the moving part inverter circuit is selected from the group consisting of a H-bridge inverter circuit, a modified H-bridge inverter circuit, a multi-phase inverter circuit, a multi-phase inverter circuit modified in consideration of a single direction current conduction, a single phase multi-level inverter circuit, a multi-phase multilevel inverter circuit, and a multi-level inverter circuit modified in consideration of a single direction current conduction.

8. The machine of claim 1, wherein the moving part inverter circuit is a multi-phase and multi-polar inverter circuit.

9. The machine of claim 1, further comprising:
   a stator inverter circuit which is connected to a stator of the wound-rotor type synchronous machine; and
   a stator circuit controller which is connected to the stator inverter circuit for thereby controlling the stator inverter circuit,
   wherein the moving part circuit controller controls a magnitude of the power supplied to the moving part inverter circuit from the stator inverter circuit.

10. The machine of claim 1, further comprising:
    a stator inverter circuit which is connected to the stator; and
    a stator circuit controller which is connected to the stator inverter circuit for controlling the stator inverter circuit,
    wherein the stator circuit controller comprises:
    a current command generator which generates a stator current command from a torque or force command;
    a high frequency voltage command generator which generates a high frequency voltage command in accordance with a position or speed or a level of the load of the moving part;
    a current controller which generates a voltage command so as to follow a current command generated by the current command generator; and
    a carriage unit which supplies a high frequency voltage command generated by the high frequency voltage command generator and a voltage command generated by the current controller,
    wherein the moving part circuit controller moves with the moving part, and
    wherein the moving part circuit controller comprises a magnetic field current command generator which generates a magnetic field current command of the moving part.

11. The machine of claim 1, further comprising:
    a stator inverter circuit which is connected to a stator of the wound-rotor type synchronous machine; and
    a stator circuit controller which is connected to the stator inverter circuit for thereby controlling the stator inverter circuit,
    wherein the stator circuit controller comprises:
    a position/speed controller which generates a current command using a position or speed of the moving part;
    a high frequency voltage command generator which generates a high frequency voltage command in accordance with a position or speed or a level of the load of the moving part;
    a current controller which generates a voltage command so as to estimate a current command generated by the position/speed controller; and
    a carriage unit which supplies to the inverter a high frequency voltage command generated by the high frequency voltage command generator and a voltage command generated by the current controller.

12. The machine of claim 11, wherein the position/speed controller detects a position or speed of the moving part and estimates a position or speed of the moving part in accordance with a current and voltage of the stator inverter circuit and generates a current command using the position or speed, and the high frequency voltage command generator generates a high frequency voltage command in accordance with the detected or estimated position or speed or the level of a load of the position/speed controller, and the current controller generates a voltage command which helps follow a current command generated by the position/speed controller.

13. The machine of claim 11, wherein the high frequency voltage command generator generates a high frequency voltage command in inverse proportion to the speed of the rotor or in proportion to the level of the load of the same when a field weakening control is necessary at above a base speed or under a low level load condition under which a high efficiency operation is available in such a way to reduce the loss occurring due to the magnetic field current.

14. The machine of claim 11, wherein the high frequency voltage command generator generates a high frequency voltage command based on modulating a level of the magnetic field current which is necessary in the moving part, by a modulation method selected from the group consisting of an amplitude modulation method of a high frequency voltage, a high frequency modulation method of a high frequency voltage and a phase modulation method of a high frequency voltage.

15. A control method of a wound-rotor type synchronous machine with an inverter circuit-integrated moving part, comprising:
   estimating a high frequency voltage of a stator inverter circuit;
   generating a magnetic field current command of a rotor using the estimated high frequency stator inverter voltage;
   generating a current command which helps follow a direct current link energy storage unit voltage of the moving part using the estimated high frequency stator inverter voltage; and
   controlling the current of a moving part circuit in accordance with a magnetic field current command generated by a magnetic field current command generator and a high frequency current command generated by a direct current link energy storage unit voltage controller.

16. The method of claim 15, wherein in the step of estimating the high frequency voltage, a high frequency voltage of a stator inverter circuit is estimated in accordance with a magnetic field current and an output voltage of the moving part inverter circuit.

17. The method of claim 15, wherein the step of controlling the current of the moving part circuit further comprises feed-backing a magnetic field current from the moving part inverter circuit.

18. The method of claim 15, wherein the step of generating the current command helping control the direct current link energy storage unit voltage of the moving part further comprises feed-backing a direct current link energy storage unit voltage from the moving part inverter circuit.

19. The method of claim 15, further comprising:
   generating a current command using a position or speed of the moving part;
   generating a high frequency voltage command in accordance with a position or speed of the moving part;
   a current control step for generating a control voltage command for following a current command generated in the step of generating the current command; and
   supplying to the inverter a high frequency voltage command generated in the high frequency voltage command generation step and a control voltage command generated in the current control step.

20. The method of claim 19, wherein in the step of generating the high frequency voltage command, a high frequency voltage command having a characteristic of an inverse proportion to the speed of the moving part in a field weakening control region or a characteristic of a proportion to the load for a high efficiency operation is generated.

21. The method of claim 19, wherein in the step of supplying the high frequency voltage command and the voltage command to the inverter, the high frequency voltage command and the voltage command are supplied to the inverter in the form of a Pulse Width Modulation (PWM).

22. The method of claim 20, wherein in the step of generating the high frequency voltage command, a high frequency voltage command is generated by modulating the level of the magnetic field current which is necessary in the moving part, by a modulation method selected from the group consisting of an amplitude modulation method of a high frequency voltage, a high frequency modulation method of a high frequency voltage and a phase modulation method of a high frequency voltage.

23. A method for estimating a position or speed of a moving part using a current and voltage of a stator inverter circuit of the wound-rotor type synchronous machine of claim 10.

\* \* \* \* \*